(12) United States Patent
Pecorini et al.

(10) Patent No.: US 7,342,059 B2
(45) Date of Patent: *Mar. 11, 2008

(54) POLYESTER-POLYCARBONATE BLENDS USEFUL FOR EXTRUSION BLOW-MOLDING

(75) Inventors: Thomas Joseph Pecorini, Kingsport, TN (US); Harold Eugene Dobbs, Kingsport, TN (US); Spencer Allen Gilliam, Kingsport, TN (US); Wesley Raymond Hale, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/737,513

(22) Filed: Dec. 16, 2003

(65) Prior Publication Data

US 2004/0138388 A1 Jul. 15, 2004

Related U.S. Application Data

(60) Provisional application No. 60/439,681, filed on Jan. 13, 2003.

(51) Int. Cl.
C08L 69/00 (2006.01)
C08L 67/02 (2006.01)

(52) U.S. Cl. .............. 524/108; 524/140; 524/147; 524/414; 524/417; 525/439; 264/523; 264/535

(58) Field of Classification Search .............. 525/439; 264/523, 535
See application file for complete search history.

(56) References Cited

U.S. PATENT DOCUMENTS

| | | | |
|---|---|---|---|
| 3,030,335 A | 4/1962 | Goldberg | |
| 3,317,466 A | 5/1967 | Caldwell et al. | |
| 3,541,059 A | 11/1970 | Schaper | |
| RE27,682 E | 6/1973 | Schnell et al. | |
| 3,799,953 A | 3/1974 | Freitag et al. | |
| 3,907,754 A | 9/1975 | Tershansy et al. | |
| 3,962,189 A | 6/1976 | Russin et al. | |
| 4,001,184 A | 1/1977 | Scott | |
| 4,001,884 A | 1/1977 | Herbst et al. | |
| 4,010,145 A | 3/1977 | Russin et al. | |
| 4,125,572 A * | 11/1978 | Scott | 524/449 |
| 4,185,009 A | 1/1980 | Idel et al. | |
| 4,286,083 A | 8/1981 | Kochanowski | |
| 4,356,299 A | 10/1982 | Cholod et al. | |
| 4,367,186 A | 1/1983 | Adelmann et al. | |
| 4,431,793 A | 2/1984 | Rosenquist | |
| 4,469,861 A | 9/1984 | Mark et al. | |
| 4,474,999 A | 10/1984 | Mark et al. | |
| 4,983,711 A | 1/1991 | Sublett et al. | |
| 5,017,680 A | 5/1991 | Sublett | |
| 5,142,088 A | 8/1992 | Phelps et al. | |
| 5,191,038 A | 3/1993 | Krabbenhoft et al. | |
| 5,254,610 A | 10/1993 | Small, Jr. et al. | |
| 5,262,511 A | 11/1993 | Caringi et al. | |
| 5,283,295 A | 2/1994 | Light et al. | |
| 5,314,949 A * | 5/1994 | Kozakura et al. | 525/67 |
| 5,420,212 A | 5/1995 | Light | |
| 5,442,036 A | 8/1995 | Beavers et al. | |
| 5,489,665 A | 2/1996 | Yamamoto et al. | |
| 5,494,992 A | 2/1996 | Kanno et al. | |
| 5,498,688 A | 3/1996 | Oshino et al. | |
| 5,668,243 A | 9/1997 | Yau et al. | |
| 5,681,918 A | 10/1997 | Adams et al. | |
| 5,907,026 A | 5/1999 | Factor et al. | |

(Continued)

FOREIGN PATENT DOCUMENTS

EP 0 273 144 A2 7/1988

(Continued)

OTHER PUBLICATIONS

Plastics TechCenter datasheet for Makrolon 1239.*
Chemical Abstract registry information for 23128-74-7.*

Primary Examiner—David J. Buttner
(74) Attorney, Agent, or Firm—B. J. Boshears; Bernard J. Graves, Jr.

(57) ABSTRACT

Blends of polycarbonate and copolyester that are capable of being extrusion blow-molded are described. The blends preferably comprise (I) about 1 to 99% by weight of a linear or branched polycarbonate and (II) about 1 to 99% by weight of a mixture of (i) about 40 to 100% by weight of a first copolyester and (ii) about 0 to 60% by weight of a second copolyester. The first copolyester preferably comprises (A) diacid residues comprising terephthalic acid residues, (B) diol residues comprising about 45 to 75 mole percent of 1,4-cyclohexanedimethanol (CHDM) residues and about 25 to 55 mole percent of ethylene glycol residues, and (C) about 0.05 to 1.0 mole percent of the residue of a trifunctional monomer. The optional second copolyester preferably comprises (A) diacid residues comprising terephthalic acid residues and (B) diol residues comprising about 52 to 90 mole percent of CHDM residues and about 10 to 48 mole percent of ethylene glycol residues. Preferably, the average amount of CHDM residues in the copolyester mixture II ranges from 52 to 75 mole percent. It has been surprisingly found that the presence of the trifunctional residues in the first copolyester can impart sufficient melt strength for the blends to be extrusion blow-molded. Containers and shaped articles made from the blends as well as a method of making the articles are also described.

16 Claims, No Drawings

U.S. PATENT DOCUMENTS

| | | |
|---|---|---|
| 6,022,941 A | 2/2000 | Mestanza et al. |
| 6,160,082 A | 12/2000 | Lin et al. |
| 6,225,436 B1 | 5/2001 | Eiffler et al. |
| 6,307,006 B1 | 10/2001 | König et al. |
| 6,323,304 B1 | 11/2001 | Lemmon et al. |
| 6,448,334 B1 | 9/2002 | Verhoogt et al. |
| 6,504,002 B1 | 1/2003 | Karlik et al. |
| 6,635,698 B2 * | 10/2003 | Goossens et al. ............ 524/126 |
| 6,680,351 B1 * | 1/2004 | Russell et al. ............... 524/120 |
| 2005/0131165 A1 * | 6/2005 | Hale et al. .................. 525/462 |

FOREIGN PATENT DOCUMENTS

| | | | |
|---|---|---|---|
| JP | 9-59371 A | | 4/1997 |
| JP | 10095903 | * | 4/1998 |
| JP | 11-100451 A | | 4/1999 |
| WO | WO 03/004561 | * | 1/2003 |
| WO | WO 2004/069931 A1 | | 8/2004 |

\* cited by examiner

POLYESTER-POLYCARBONATE BLENDS USEFUL FOR EXTRUSION BLOW-MOLDING

CROSS-REFERENCE TO RELATED APPLICATIONS

This application claims the benefit of the filing date of U.S. Provisional Patent Application No. 60/439,681, filed on Jan. 13, 2003, under 35 U.S.C. §119(e). The entire content of the '681 application is hereby incorporated by reference.

FIELD OF THE INVENTION

This invention generally relates to blends of polycarbonate and copolyesters that are capable of being extrusion blow-molded. The invention also relates to containers and shaped articles made from the blends as well as a method of making the articles.

BACKGROUND OF THE INVENTION

Various types of containers currently made from glass are being replaced by plastic containers due to the weight, bulkiness, and susceptibility to breakage inherent in glass containers. In many cases, these containers can be manufactured from existing polymers, such as the polyesters described in U.S. Pat. No. 4,983,711. Polyvinylchloride (PVC) and polycarbonate (PC) are other materials often used for extrusion blow-molded containers. In certain circumstances, however, these polymers do not meet fitness-for-use criteria when used in their neat form. For example, when the containers must contain liquids hotter than 75° C., the polyesters described in the '711 patent and PVC are not adequate due to low softening points. Similarly, polycarbonate is often unacceptable in the same applications due to poor chemical resistance to the contents or cleaners used during processing of the bottles. In addition, polycarbonate often requires complicated annealing procedures to remove residual stresses formed during processing.

In order to take advantage of selected properties of different polymers, for example, high temperature resistance and good chemical resistance, they are often blended together. However, not all blends are transparent; thus, the selection of materials that can be blended together is further limited by the need to create transparent containers.

Blends of polycarbonate and certain polyesters are used in injection molding and sheet extrusion applications. These blends are clear and can provide a good balance of chemical resistance and heat resistance. However, existing commercial transparent blends of polycarbonate and polyesters cannot be processed by extrusion blow-molding due to lack of melt strength.

Manufacturing equipment and processes have been designed and put into use for the cost-efficient production of various types and sizes of containers at high rates. One of these manufacturing processes is extrusion blow-molding wherein a polymer melt is extruded from a die downward in the shape of a hollow cylinder or tube. Bottles and other shaped articles are produced by clamping a mold around the molten, hollow cylinder and injecting a gas, e.g., air, into the molded-encased cylinder to force the molten polymer into the mold. For a polymer to be useful in extrusion blow-molding processes, the polymer should possess sufficient melt strength. To be useful for the production of rigid (self-supporting) containers, especially relatively large containers, e.g., containers intended for packaging volumes of 3 L or greater, and containers having an irregular shape, the polymer should also possess adequate physical, tensile, and thermal properties.

Many polymeric materials do not possess melt strength sufficient to render them suitable for extrusion blow-molding, and when extruded downward from a die, the polymer melt drops rapidly and forms a thin string and/or breaks. Polymers suitable for extrusion blow-molding have a melt strength that is sufficient to support the weight of the polymer. Good melt strength is desired for the manufacture by extrusion blow-molding of containers having uniform wall thickness.

Since melt strength is related to slow flow, which is induced primarily by gravity, melt strength can be related to the viscosity of a polymer measured at a low shear rate, such as 1 radian/second. Viscosity can be measured by typical viscometers, such as a parallel plate viscometer. Typically, viscosity is measured at the typical processing temperature for the polymer and is measured at a series of shear rates, often between 1 radian/second and 400 radian/second. In extrusion blow-molding, the viscosity at 1 radian/second at processing temperatures typically needs to be above 30,000 poise in order to blow a bottle. Larger parisons require higher viscosities.

Melt strength, however, only defines one of the polymer processing characteristics desired in extrusion blow-molding. Another desired characteristic is the ease of flow at high shear rates. The polymer is "melt processed" at shear rates ranging anywhere from about 10 $s^{-1}$ to 1000 $s^{-1}$ in the die/extruder. A typical shear rate encountered in the barrel or die during extrusion blow-molding or profile extrusion is 400 radians/second. These high shear rates are encountered as the polymer flows down the extruder screw, or as it passes through the die. These high shear rates are desired to maintain reasonably fast production rates. Unfortunately, high melt viscosity at high shear rates can lead to viscous dissipation of heat, in a process referred to as shear heating. Shear heating raises the temperature of the polymer, and the extent of temperature rise is directly proportional to the viscosity at that shear rate. Since viscosity decreases with increasing temperature, shear heating decreases the low shear rate viscosity of the polymer, and thus, its melt strength decreases.

Furthermore, a high viscosity at high shear rates (for example, as found in the die) can create a condition known as melt fracture or "sharkskin" on the surface of the extruded part or article. Melt fracture is a flow instability phenomenon occurring during extrusion of thermoplastic polymers at the fabrication surface/polymer melt boundary. The occurrence of melt fracture produces severe surface irregularities in the extrudate as it emerges from the orifice. The naked eye detects this surface roughness in the melt-fractured sample as a frosty appearance or matte finish as opposed to an extrudate without melt fracture that appears clear. Melt fracture can occur whenever the wall shear stress in the die exceeds a certain value, typically 0.1 to 0.2 MPa. The wall shear stress is directly related to the volume throughput or line speed (which dictates the shear rate) and the viscosity of the polymer melt. By reducing either the line speed or the viscosity at high shear rates, the wall shear stress is reduced, lowering the possibility for melt fracture to occur. Although the exact shear rate at the die wall is a function of the extruder output and the geometry and finish of the tooling, a typical shear rate that is associated with the onset of melt fracture is 400 radian/sec. Likewise, the viscosity at this shear rate typically needs to be below 10,000 poise.

To couple all of these desired properties, the ideal extrusion blow-molding polymer, from a processability standpoint, will possess a high viscosity at low shear rates in conjunction with a low viscosity at high shear rates. Fortunately, most polymers naturally exhibit at least some degree of viscosity reduction between low and high shear rates, known as "shear thinning", which aids in their processability. Based on the preceding discussion, one definition of shear thinning relevant to extrusion blow-molding would be the ratio of the viscosity measured at 1 radian/second to the viscosity measured at 400 radians/second when both viscosities are measured at the same temperature. The measurement temperature selected should be typical of the actual processing conditions and one that provides a viscosity of 10,000 poise or less at 400 rad/sec. This definition will be used to describe shear thinning for the purposes of this invention. Based on the preceding discussion, a good extrusion blow-molding material would possess a shear thinning ratio of 3.0 or higher when measured at a temperature that provides a viscosity at 400 rad/sec of 10,000 poise or less.

SUMMARY OF THE INVENTION

In one aspect, the invention relates to a blend that is capable of being extrusion blow-molded. The blend comprises:
- I. about 1 to 99 weight percent of a polycarbonate comprising a diol component comprising about 90 to 100 mole percent of 4,4'-isopropylidenediphenol units and about 0 to 10 mol percent modifying diol units having 2 to 16 carbon atoms; and
- II. about 1 to 99 weight percent of a mixture comprising:
  - A. about 40 to 100 weight percent of a first copolyester that preferably has an inherent viscosity of about 0.5 to 1.1 and a shear thinning ratio of at least about 5, and comprises:
    - (1) diacid residues comprising terephthalic acid residues;
    - (2) diol residues comprising about 45 to 75 mole percent of 1,4-cyclohexanedimethanol residues and about 25 to 55 mole percent of ethylene glycol residues; and
    - (3) about 0.05 to 1.0 mole percent of the residue of a trifunctional monomer; and
  - B. about 0 to 60 weight percent of a second copolyester comprising:
    - (1) diacid residues comprising terephthalic acid residues; and
    - (2) diol residues comprising about 52 to 90 mole percent 1,4-cyclohexanedimethanol residues and about 10 to 48 mole percent ethylene glycol residues,
  wherein the average amount of 1,4-cyclohexanedimethanol residues in the first and second copolyesters is between 52 to 75 mole percent.

In a preferred embodiment, the blend comprises between 45 and 90 weight percent of the copolyester mixture and between 10 and 55 weight percent of the polycarbonate, and the first copolyester preferably has an inherent viscosity of about 0.5 to 1.1 and a shear thinning ratio of at least about 5, and comprises:
- A. diacid residues comprising terephthalic acid residues;
- B. diol residues comprising about 52 to 75 mole percent of 1,4-cyclohexanedimethanol residues and about 25 to 48 mole percent of ethylene glycol residues; and
- C. about 0.05 to 1.0 mole percent of the residue of a trifunctional monomer.

In another aspect, the invention relates to a method of making a clear article. The method comprises the steps of:
- (a) blending a polycarbonate, a first copolyester, and optionally a second copolyester;
- (b) before, during, or after step (a), melting the polycarbonate, the first copolyester, and optionally the second copolyester to form a melt blend; and
- (c) cooling the melt blend to form a clear article.

In another aspect, the invention relates to shaped articles extrusion blow-molded from the blends according this invention.

In yet another aspect, the invention relates to containers extrusion blow-molded from the blends according this invention.

DETAILED DESCRIPTION OF THE INVENTION

It has been surprisingly found that certain copolyesters can be blended with polycarbonate to provided sufficient melt strength for extrusion blow-molding. The resultant blends are clear and do not produce problems with crystallization during the extrusion blow-molding process. Preferably, the blends have a shear thinning ratio of at least about 3 and are comprised of (A) about 1 to 99% (more preferably, 10 to 55%) by weight of a linear or branched polycarbonate and (B) about 1 to 99% (more preferably, 45 to 90%) by weight of a mixture of 40 to 100% by weight of a first copolyester and 0 to 60% by weight of a second copolyester. Preferably, the average amount of 1,4-cyclohexanedimethanol residues in the mixture of the first copolyester and the second copolyester ranges from 52 to 75 mole percent.

The first copolyesters provided by our invention preferably have an inherent viscosity of about 0.5 to 1.1 and a shear thinning ratio of at least about 5, and are comprised of:
- A. diacid residues comprising terephthalic acid residues;
- B. diol residues comprising about 45 to 75 mole percent 1,4-cyclohexanedimethanol residues and about 25 to 55 mole percent ethylene glycol residues; and
- C. about 0.05 to 1.0 mole percent of the residue of a trifunctional monomer.

An especially preferred group of the first copolyesters has an inherent viscosity of about 0.6 to 0.9 and a shear thinning ratio of at least about 5, and comprises:
- A. diacid residues consisting essentially of terephthalic acid residues;
- B. diol residues consisting essentially of about 52 to 75 mole percent of 1,4-cyclohexanedimethanol residues and about 25 to 48 mole percent of ethylene glycol residues; and
- C. about 0.1 to 0.25 mole percent of trimellitic acid or anhydride residues.

An optional second copolyester provided by our invention preferably has an inherent viscosity of about 0.5 to 1.1 and a shear thinning ratio of at least about 2, and is comprised of:
- A. diacid residues comprising terephthalic acid residues;
- B. diol residues comprising about 52 to 90 mole percent 1,4-cyclohexanedimethanol residues and about 10 to 48 mole percent ethylene glycol residues.

These copolyesters have been found to be useful for making blends with polycarbonate that can be extrusion blow-molded to produce transparent, noncrystalline articles such as containers. These containers exhibit good resistance to deformation when filled with liquids heated up to 85° C., and some compositions exhibit good resistance to deformation when filled with liquids heated up to 100° C. (boiling point of water). It has been surprisingly found that the presence of the trifunctional residues in the first copolyester can impart sufficient melt strength for the blends to be extrusion blow-molded even when non-branched polycarbonate is used in the blends.

Preferably, diacid residues A contain at least 40 mole percent, and more preferably 100 mole percent, of terephthalic acid residues. The remainder of the diacid component A may be made up of one more alicyclic and/or aromatic dicarboxylic acid residues commonly present in polyesters.

Examples of such dicarboxylic acids include 1,2-, 1,3- and 1,4-cyclohexanedicarboxylic; 2,6- and 2,7-naphthalenedicarboxylic; isophthalic; and the like. Diacid residues A may be derived from the dicarboxylic acids or from ester forming derivatives thereof such as dialkyl esters or acids chlorides.

The trifunctional residues C can be derived from tricarboxylic acids or ester forming derivatives thereof such as trimellitic (1,2,4-benzenetricarboxylic) acid and anhydride, hemimellitic (1,2,3-benzenetricarboxylic) acid and anhydride, trimesic (1,3,5-benzenetricarboxylic) acid, and tricarballyic (1,2,3-propanetricarboxylic) acid. Generally, any tricarboxyl residue containing about 6 to 9 carbon atoms may be used as component C. The trifunctional residue may also be derived from an aliphatic triol containing about 3 to 8 carbon atoms such as glycerin, trimethylolethane, and trimethylolpropane. The amount of the trifunctional monomer residue present in the first copolyester is preferably in the range of about 0.10 to 0.25 mole percent. The preferred trifunctional monomer residues are residues of benzenetricarboxylic acids (including anhydrides), especially trimellitic acid or anhydride.

The mole percentages referred to herein are based on 100 mole percent (or the total number of moles) of the particular component in question. For example, the expression "diacid residues comprising at least 40 mole percent terephthalic residues" means that at least 40 percent of the moles of diacid residues in the copolyester are terephthalic residues. The balance of the diacid residues can be some other species. The mole percent of the trifunctional component C in the first copolyester is based on (1) the moles of diacid component A when component C is a triacid residue or (2) the moles of diol component B when component C is a triol residue.

When the word "about" precedes a numerical range, it is intended that the word modifies both the lower as well as the higher value of the range.

When the blend comprises a mixture of copolyesters, an especially preferred group of our first copolyesters has an inherent viscosity of about 0.6 to 0.9 and a shear thinning ratio of at least about 5, and is comprised of:
  A. diacid residues consisting essentially of terephthalic acid residues;
  B. diol residues consisting essentially of about 48 to 65 mole percent 1,4-cyclohexanedimethanol residues and about 35 to 52 mole percent ethylene glycol residues; and
  C. about 0.1 to 0.25 mole percent of trimellitic acid or anhydride residues.

The copolyesters of our invention may be prepared using procedures well known in the art for the preparation of high molecular weight polyesters. For example, the copolyesters may be prepared by direct condensation using a dicarboxylic acid or by ester interchange using a dialkyl dicarboxylate. Thus, a dialkyl terephthalate such as dimethyl terephthalate is ester interchanged with the diols at elevated temperatures in the presence of a catalyst. Polycondensation is carried out at increasing temperatures and at reduced pressures until a copolyester having the desired inherent viscosity is obtained. The inherent viscosities (I.V., dl/g) reported herein were measured at 25° C. using 0.5 g polymer per 100 mL of a solvent consisting of 60 parts by weight phenol and 40 parts by weight tetrachloroethane. The mole percentages of the diol residues of the polyesters were determined by nuclear magnetic resonance.

Examples of the catalyst materials that may be used in the synthesis of the polyesters utilized in the present invention include titanium, manganese, zinc, cobalt, antimony, gallium, lithium, calcium, silicon, and germanium. Such catalyst systems are described in U.S. Pat. Nos. 3,907,754; 3,962,189; 4,010,145; 4,356,299; 5,017,680; 5,668,243; and 5,681,918, the contents of which are herein incorporated by reference in their entirety. Preferred catalyst metals include titanium and manganese and most preferred is titanium. The amount of catalytic metal used may range from about 5 to 100 ppm, but the use of catalyst concentrations of about 5 to 35 ppm titanium is preferred in order to provide polyesters having good color, thermal stability, and electrical properties. Phosphorus compounds frequently are used in combination with the catalyst metals, and any of the phosphorus compounds normally used in making polyesters may be used. Up to about 100 ppm phosphorus typically may be used.

The polycarbonate portion of the present blend preferably has a diol component containing about 90 to 100 mole percent bisphenol A units, and 0 to about 10 mole percent can be substituted with units of other modifying aliphatic or aromatic diols, besides bisphenol A, having from 2 to 16 carbons. The polycarbonate can contain branching agents, such as tetraphenolic compounds, tri-(4-hydroxyphenyl) ethane, pentaerythritol triacrylate and others discussed in U.S. Pat. Nos. 6,160,082; 6,022,941; 5,262,511; 4,474,999; and 4,286,083. Other suitable branching agents are mentioned herein below. It is preferable to have at least 95 mole percent of diol units in the polycarbonate being bisphenol A. Suitable examples of modifying aromatic diols include the aromatic diols disclosed in U.S. Pat. Nos. 3,030,335 and 3,317,466.

The inherent viscosity of the polycarbonate portion of the blends according to the present invention is preferably at least about 0.3 dL/g, more preferably at least 0.5 dL/g, determined at 25° C. in 60/40 wt/wt phenol/tetrachloroethane.

The melt flow of the polycarbonate portion of the blends according to the present invention is preferably between 1 and 20, and more preferably between 2 and 18, as measured according to ASTM D1238 at a temperature of 300° C. and using a weight of 1.2 kg.

The polycarbonate portion of the present blend can be prepared in the melt, in solution, or by interfacial polymerization techniques well known in the art. Suitable methods include the steps of reacting a carbonate source with a diol at a temperature of about 0° C. to 315° C. at a pressure of about 0.1 to 760 mm Hg for a time sufficient to form a polycarbonate. Commercially available polycarbonates that can be used in the present invention, are normally made by reacting an aromatic diol with a carbonate source such as phosgene, dibutyl carbonate, or diphenyl carbonate, to incorporate 100 mol percent of carbonate units, along with 100 mol percent diol units into the polycarbonate. For examples of methods of producing polycarbonates, see U.S. Pat. Nos. 5,498,688; 5,494,992; and 5,489,665, which are incorporated by reference in their entirety.

Processes for preparing polycarbonates are known in the art. The linear or branched polycarbonate that can be used in the invention disclosed herein is not limited to or bound by the polycarbonate type or its production method. Generally, a dihydric phenol, such as bisphenol A, is reacted with phosgene with the use of optional mono-functional compounds as chain terminators and tri-functional or higher functional compounds as branching or crosslinking agents. Reactive acyl halides are also condensation polymerizable and have been used in polycarbonates as terminating compounds (mono-functional), comonomers (di-functional), or branching agents (tri-functional or higher).

One method of forming branched polycarbonates, disclosed, for example, in U.S. Pat. No. 4,001,884, involves the incorporation of an aromatic polycarboxylic acid or functional derivative thereof in a conventional polycarbonate-forming reaction mixture. The examples in the '884 patent demonstrate such incorporation in a reaction in which phosgene undergoes reaction with a bisphenol, under alkaline conditions typically involving a pH above 10. Experience has shown that a preferred aromatic polycarboxylic acid derivative is trimellitic acid trichloride. Also disclosed in the aforementioned patent is the employment of a monohydric phenol as a molecular weight regulator; it functions as a chain termination agent by reacting with chloroformate groups on the forming polycarbonate chain.

U.S. Pat. No. 4,367,186 disclose a process for producing cross-linked polycarbonates wherein a cross-linkable polycarbonate contains methacrylic acid chloride as a chain terminator. A mixture of bisphenol A, aqueous sodium hydroxide, and methylene chloride is prepared. To this is added a solution of methacrylic acid chloride in methylene chloride. Then, phosgene is added, and an additional amount of aqueous sodium hydroxide is added to keep the pH between 13 and 14. Finally, the triethylamine coupling catalyst is added.

EP 273 144 discloses a branched poly(ester)carbonate which is end capped with a reactive structure of the formula —C(O)—CH=CH—R, wherein R is hydrogen or $C_{1-3}$ alkyl. This polycarbonate is prepared in a conventional manner using a branching agent, such as trimellityl trichloride and an acryloyl chloride to provide the reactive end groups. According to the examples, the process is carried out by mixing water, methylene chloride, triethylamine, bisphenol A, and optionally para-t-butyl phenol as a chain terminating agent. The pH is maintained at 9 to 10 by addition of aqueous sodium hydroxide. A mixture of terephthaloyl dichloride, isophthaloyl dichloride, methylene chloride, and optionally acryloyl chloride, and trimellityl trichloride is added dropwise. Phosgene is then introduced slowly into the reaction mixture.

Randomly branched polycarbonates and methods of preparing them are known from U.S. Pat. No. 4,001,184. At least 20 weight percent of a stoichiometric quantity of a carbonate precursor, such as an acyl halide or a haloformate, is reacted with a mixture of a dihydric phenol and at least 0.05 mole percent of a polyfunctional aromatic compound in a medium of water and a solvent for the polycarbonate. The medium contains at least 1.2 mole percent of a polymerization catalyst. Sufficient alkali metal hydroxide is added to the reaction medium to maintain a pH range of 3 to 6, and then sufficient alkali metal hydroxide is added to raise the pH to at least 9 but less than 12 while reacting the remaining carbonate precursor.

U.S. Pat. No. 6,225,436 discloses a process for preparing polycarbonates which allows the condensation reaction incorporation of an acyl halide compound into the polycarbonate in a manner which is suitable in batch processes and in continuous processes. Such acyl halide compounds can be mono-, di-, tri- or higher-functional and are preferably for branching or terminating the polymer molecules or providing other functional moieties at terminal or pendant locations in the polymer molecule.

U.S. Pat. No. 5,142,088 discloses the preparation of branched polycarbonates, and more particularly to novel intermediates useful in the preparation and a method for conversion of the intermediates via chloroformate oligomers to the branched polycarbonates. One method for making branched polycarbonates with high melt strength is a variation of the melt-polycondensation process where the diphenyl carbonate and Bisphenol A are polymerized together with polyfunctional alcohols or phenols as branching agents.

DE 19727709 discloses a process to make branched polycarbonate in the melt-polymerization process using aliphatic alcohols. It is known that alkali metal compounds and alkaline earth compounds, when used as catalysts added to the monomer stage of the melt process, will not only generate the desired polycarbonate compound, but also other products after a rearrangement reaction known as the "Fries" rearrangement. This is discussed in U.S. Pat. No. 6,323,304. The presence of the Fries rearrangement products in a certain range can increase the melt strength of the polycarbonate resin to make it suitable for bottle and sheet applications. This method of making a polycarbonate resin with a high melt strength has the advantage of having lower raw material costs compared with the method of making a branched polycarbonate by adding "branching agents." In general, these catalysts are less expensive and much lower amounts are required compared to the branching agents.

JP 09059371 discloses a method for producing an aromatic polycarbonate in the presence of a polycondensation catalyst, without the use of a branching agent, which results in a polycarbonate possessing a branched structure in a specific proportion. In particular, JP 09059371 discloses the fusion-polycondensation reaction of a specific type of aromatic dihydroxy compound and diester carbonate in the presence of an alkali metal compound and/or alkaline earth metal compound and/or a nitrogen-containing basic compound to produce a polycarbonate having an intrinsic viscosity of at least 0.2. The polycarbonate is then subject to further reaction in a special self-cleaning style horizontal-type biaxial reactor having a specified range of the ratio L/D of 2 to 30 (where L is the length of the horizontal rotating axle and D is the rotational diameter of the stirring fan unit). JP 09059371 teaches the addition of the catalysts directly to the aromatic dihydroxy compound and diester carbonate monomers.

U.S. Pat. No. 6,504,002 discloses a method for production of a branched polycarbonate composition, having increased melt strength, by late addition of branch-inducing catalysts to the polycarbonate oligomer in a melt polycondensation process, the resulting branched polycarbonate composition, and various applications of the branched polycarbonate composition. The use of polyhydric phenols having three or more hydroxy groups per molecule, for example, 1,1,1-tris-(4-hydroxyphenyl)ethane (THPE), 1,3,5-tris-(4-hydroxyphenyl)benzene, 1,4-bis-[di-(4-hydroxyphenyl)phenylmethyl]benzene, and the like, as branching agents for high melt strength blow-moldable polycarbonate 30 resins prepared interfacially has been described in U.S. Pat. Nos. Re. 27,682 and 3,799,953.

Other methods known to prepare branched polycarbonates through heterogeneous interfacial polymerization methods include the use of cyanuric chloride as a branching agent (U.S. Pat. No. 3,541,059), branched dihydric phenols as branching agents (U.S. Pat. No. 4,469,861), and 3,3-bis-(4-hydroxyaryl)-oxindoles as branching agents (U.S. Pat. No. 4,185,009). Additionally, aromatic polycarbonates endcapped with branched alkyl acyl halides and/or acids and said to have improved properties are described in U.S. Pat. No. 4,431,793.

Trimellitic triacid chloride has also been used as a branching agent in the interfacial preparation of branched polycarbonate. U.S. Pat. No. 5,191,038 discloses branched polycarbonate compositions having improved melt strength and a method of preparing them from aromatic cyclic polycarbonate oligomers in a melt equilibration process.

The novel polymer blends of the present invention preferably contain a phosphorus catalyst quencher component, typically one or more phosphorus compounds such as a phosphorus acid, e.g., phosphoric and/or phosphorous acids, or an ester of a phosphorus acid such as a phosphate or phosphite ester. Further examples of phosphorus catalyst quenchers are described in U.S. Pat. Nos. 5,907,026 and 6,448,334. The amount of phosphorus catalyst quencher present typically provides an elemental phosphorus content of about 0 to 0.5 weight percent, preferably 0.1 to 0.25 weight percent, based on the total weight of the blend.

The blends may also include other additives, such as heat stabilizers, UV stabilizers, antioxidants, UV absorbers, mold releases, biocides, plasticizers, or fillers such as clay, mica, talc, ceramic spheres, glass spheres, glass flakes, and the like. Additives such as these are typically used in relatively small quantities. These additives may be incorporated into the blends of the invention by way of concentrates. These concentrates may use polyesters that are not of the composition described above. If so, these other polyesters are preferably not added in quantities exceeding 5 weight percent.

The blends may be prepared using procedures well known in the art including, but not restricted to, compounding in a single screw extruder, compounding in a twin screw extruder, or simply pellet blending the components together prior to extrusion blow-molding.

A typical method of preparing the blends involves 1) adding pellets of the polycarbonate, the first copolyester, and optionally the second copolyester to an extruder using additive feeders, melt feeders or by preblending the pellets; 2) melting the polycarbonate, the first copolyester, and optionally the second copolyester in the extruder; 3) blending the polycarbonate, the first copolyester, and optionally the second copolyester by shearing action of the extruder screw to form a melt blend; and 4) cooling the melt blend to form clear pellets. The temperature settings of the extruder should be set at greater than 230° C., preferably greater than 250° C. The compounding process may use either a single or twin screw extruders. Alternatively, the pellets of the polycarbonate, the first copolyester, and optionally the second copolyester may be placed directly into the extruder used to extrusion blow-mold the final articles, without a prior compounding step.

Known extrusion blow-molding techniques may be used to make shaped articles or containers from the polymer blends of the present invention. A typical extrusion blow-molding manufacturing process involves: 1) melting the resin in an extruder; 2) extruding the molten resin through a die to form a tube of molten polymer (i.e., a parison) having a uniform side wall thickness; 3) clamping a mold having the desired finished shape around the parison; 4) blowing air into the parison, causing the extrudate to stretch and expand to fill the mold; 5) cooling the molded article; and 6) ejecting the article from the mold.

The polymer blends of the present invention are characterized by a novel combination of properties including low haze. Haze can be determined by two methods. The first method is visual observation of the blend extrudate where about 300 grams of the melt blended material is collected in a pile and set aside and allowed to slowly cool to room temperature. The pile of cooled blend is then examined visually for haze. The second method measures haze according to ASTM D1003 on extrusion molded bottle sidewalls using a HunterLab UltraScan Sphere 8000. % Haze=100 * Diffuse Transmission/Total Transmission. Diffuse transmission is obtained by placing a light trap on the other side of the integrating sphere from where the sample port is, thus eliminating the straight-through light path. Only light scattered by greater than 2.5 degrees is measured. Total transmission includes measurement of light passing straight-through the sample and also off-axis light scattered to the sensor by the sample. The sample is placed at the exit port of the sphere so that off-axis light from the full sphere interior is available for scattering. (Regular transmission is the name given to measurement of only the straight-through rays—the sample is placed immediately in front of the sensor, which is approximately 20 cm away from the sphere exit port—this keeps off-axis light from impinging on the sample.)

The melt viscosity of the materials used herein is measured at 240° C. and is determined with a Rheometrics Mechanical Spectrometer (RMS 800) with 25 mm parallel plates. Samples are vacuum dried at 70° C. overnight or longer before testing. The units are reported in Poise (P).

The glass transition temperatures (Tgs) of the blends were determined using a TA Instruments 2950 differential scanning calorimeter (DSC) at a scan rate of 20° C./minute. The values reported below are from the second DSC scan.

EXAMPLES

The polymer blends provided by the present invention and the preparation thereof, including the preparation of representative polyesters, are further illustrated by the following examples.

Comparative Examples 1-3 and Examples 1-5

Blends were prepared by combining polyester with polycarbonate and a phosphorus additive. A summary of materials used is shown in Table 1.

The copolyesters and polycarbonates used in the blends are listed below and were prepared by methods well known in the art for the preparation of high molecular weight polyesters.

Copolyester A is a branched copolyester comprising a diacid component containing 100 mole percent terephthalic acid residues and a diol component containing 59-63 mole percent 1,4-cyclohexanedimethanol (CHDM) residues and 37-41 mole percent ethylene glycol residues and also containing 0.18 mole percent trimellitic anhydride (TMA) residues.

Copolyester B is a branched copolyester comprising a diacid component containing 100 mole percent terephthalic acid residues and a diol component containing 56 mole percent CHDM residues and 44 mole percent ethylene glycol residues and also containing 0.18 mole percent TMA residues.

Copolyester C is a branched copolyester comprising a diacid component containing 100 mole percent terephthalic acid residues and a diol component containing 48-52 mole percent CHDM residues and 52-48 mole percent ethylene glycol residues and also containing 0.18 mole percent TMA residues.

Copolyester D is a linear copolyester comprising a diacid component containing 100 mole percent terephthalic acid residues and a diol component containing 62 mole percent CHDM residues and 38 mole percent ethylene glycol residues.

Copolyester E is a linear copolyester comprising a diacid component containing 100 mole percent terephthalic acid residues and a diol component containing 81 mole percent CHDM residues and 19 mole percent ethylene glycol.

Polycarbonate X is a linear polycarbonate produced by Dow Chemical Company under the commercial name Calibre 300-10. It has a melt flow rate (MFR) of 10 measured according to ASTM D1238 at 300° C. using a 1.2 kg mass.

Polycarbonate Y is a branched polycarbonate produced by Dow Chemical Company under the commercial name Calibre 603-3. It has a melt flow rate (MFR) of 3 measured according to ASTM D1238 at 300° C. using a 1.2 kg mass.

The phosphorus concentrate (designated "conc" in Table 1) was prepared by first compounding Weston 619, a distearyl pentaerythritol diphosphite available from GE Specialty Plastics, into copolyester D on a single screw extruder at 270° C. This composition is then tumble-blended with 5 wt % water at 80° C. for 8 hours to hydrolyze the Weston 619. The final phosphorus content of the pellets is 5 weight percent elemental phosphorus based on total pellet weight.

All blends were prepared on a Sterling 1.25 inch single screw extruder at 260° C. melt temperature and 90 rpm. The copolyesters were dried at 70° C., and the bisphenol A polycarbonate was dried at 120° C. overnight. In each blend example, 57 parts by weight of the copolyesters were combined with 40 parts by weight bisphenol A polycarbonate and 3 parts by weight of the phosphorus additive, except for Comparative Example 2 where 47 parts by weight of the copolyester were combined with 50 parts by weight bisphenol A polycarbonate and 3 parts by weight of the phosphorus additive.

Comparative Example 1 is an example of neat copolyester C. This material has a good shear thinning ratio, but does not possess a sufficiently high glass transition temperature (Tg) for high heat applications.

Comparative Example 2 is an example of a blend that does not contain any branched copolyester. This blend does possess a sufficiently high glass transition temperature for high heat applications, but does not have a high enough shear thinning ratio to be blown into bottles.

Comparative Example 3 is an example of a blend of polycarbonate with a copolyester that has too low a level of CHDM. This blend is hazy.

Examples 1-5 are examples of the invention that possess high glass transition temperatures, possess good shear thinning ratios, and are free of haze.

The materials were extruded into water bottles having a volume of 3.785 liters (1 U.S. gallon), using a 100 mm die. The bottles weighed 150 grams. Haze in the bottle sidewall was measured to be 0.38%.

Example 7

Bottles were generated from the blend prepared in Example 2 using an 80 mm Bekum H-121 continuous extrusion blow-molding machine fitted with a barrier screw. The materials were dried for 8 hours at 65° C. (150° F.) prior to extrusion. The extruder was run at 21 revolutions per minute (RPM) using a 200° C. (392° F.) barrel temperature and a 190° C. (375° F.) head temperature. The temperature of the melt was 218° C. (425° F.), measured by inserting a melt probe directly into the parison 5 mm out from the die. The materials were extruded into water bottles having a volume of 3.785 liters (1 U.S. gallon), using a 100 mm die. The bottles weighed 150 grams. Haze in the bottle sidewall was measured to be 0.71%.

Example 8

Bottles were generated from the blend prepared in Example 3 using an 80 mm Bekum H-121 continuous

TABLE 1

| Ex. | CPE A | CPE B | CPE C | CPE D | CPE E | Avg. mole % CHDM | PC X | PC Y | Conc | Tg (° C.) | Haze (visual) | Melt viscosity at 240° C. 1 rad/sec | Melt viscosity at 240° C. 400 rad/sec | Shear thinning ratio |
|---|---|---|---|---|---|---|---|---|---|---|---|---|---|---|
| CE-1 | | | 100 | | | 50 | | | | 83 | clear | 47000 | 8400 | 5.60 |
| CE-2 | | | | | 47 | 81 | 50 | | 3 | 113 | clear | 17100 | 8700 | 1.97 |
| CE-3 | | | 57 | | | 50 | 40 | | 3 | | hazy | 31200 | 9000 | 3.47 |
| E-1 | | 57 | | | | 56 | 40 | | 3 | | clear | | | |
| E-2 | 57 | | | | | 62 | 40 | | 3 | | clear | 39300 | 10000 | 3.93 |
| E-3 | 57 | | | | | 59 | | 40 | 3 | 105 | clear | 46300 | 9800 | 5.55 |
| E-4 | | | 32 | | 25 | 64 | | 40 | 3 | 106 | clear | 36300 | 9700 | 3.75 |
| E-5 | | | 32 | 25 | | 56 | | 40 | 3 | 104 | clear | 38300 | 9800 | 3.91 |

Comparative Example 4

Bottles were generated from the blends prepared in Comparative Example 3 using an 80 mm Bekum H-121 continuous extrusion blow-molding machine fitted with a barrier screw. The materials were dried for 12 hours at 65° C. (150° F.) prior to extrusion. The extruder was run at 12 revolutions per minute (RPM) using a 215° C. (420° F.) barrel temperature and a 199° C. (390° F.) head temperature. The temperature of the melt was 232° C. (449° F.), measured by inserting a melt probe directly into the parison 5 mm out from the die. The materials were extruded into water bottles having a volume of 3.785 liters (1 U.S. gallon), using a 100 mm die. The bottles weighed 175 grams. Haze in the bottle sidewall was measured to be 3.94%.

Example 6

Bottles were generated from the blend prepared in Example 1 using an 80 mm Bekum H-121 continuous extrusion blow-molding machine fitted with a barrier screw. The materials were dried for 12 hours at 65° C. (150° F.) prior to extrusion. The extruder was run at 27 revolutions per minute (RPM) using a 199° C. (390° F.) barrel temperature and a 199° C. (390° F.) head temperature. The temperature of the melt was 239° C. (452° F.), measured by inserting a melt probe directly into the parison 5 mm out from the die.

extrusion blow-molding machine fitted with a barrier screw containing a Maddock mixing section. The materials were dried for 8 hours at 65° C. (150° F.) prior to extrusion. The extruder was run at 10 revolutions per minute (RPM) using a 232° C. (450° F.) barrel temperature and a 232° C. (450° F.) head temperature. The temperature of the melt was 249° C. (481° F.), measured by inserting a melt probe directly into the parison 5 mm out from the die. The materials were extruded into handleware bottles having a volume of 1.89 liters (64 ounces), using a 70 mm die. The bottles weighed 120 grams. Haze in the bottle sidewall was measured to be 0.59%.

Example 9

Bottles were generated from the blend prepared in Example 4 using an 80 mm Bekum H-121 continuous extrusion blow-molding machine fitted with a barrier screw containing a Maddock mixing section. The materials were dried for 8 hours at 65° C. (150° F.) prior to extrusion. The extruder was run at 10 revolutions per minute (RPM) using a 232° C. (450° F.) barrel temperature and a 232° C. (450° F.) head temperature. The temperature of the melt was 250° C. (483° F.), measured by inserting a melt probe directly into the parison 5 mm out from the die. The materials were extruded into handleware juice bottles having a volume of 1.89 liters (64 ounces), using a 70 mm die. The bottles weighed 90 grams. Haze in the bottle sidewall was measured to be 0.67%.

The invention has been described in detail with particular reference to preferred embodiments and working examples, but it will be understood that variations and modifications can be made without departing from the spirit and scope of the invention, as defined by the following claims.

We claim:

1. A visually clear blend that is capable of being extrusion blow-molded, said blend comprising a polycarbonate, at least two copolyesters, and a phosphorus catalyst quencher;
   wherein the at least two copolyesters have different amounts of 1,4-cyclohexandimethanol residues from each other, but comprise an average of about 52 to 75 mole % of 1,4-cyclohexanedimethanol residues based on the total mole % of diol residues and about 0.05 to 1.0 mole % of the residue of a trifunctional monomer.

2. The blend according to claim 1, which comprises 45 to 90 weight percent of copolyesters and 10 to 55 weight percent of polycarbonate.

3. The blend according to claim 2, which has a shear thinning ratio of at least about 3.

4. The blend according to claim 1, wherein the polycarbonate has a melt flow rate between 2 and 18.

5. The blend according to claim 1, wherein the polycarbonate comprises a branching agent.

6. The blend according to claim 1, which comprises a first copolyester and a second copolyester,
   wherein the first copolyester has an inherent viscosity of about 0.5 to 1.1 and a shear thinning ratio of at least about 5, and comprises:
   A. diacid residues comprising terephthalic acid residues;
   B. diol residues comprising about 45 to 75 mole percent of 1,4-cyclohexanedimethanol residues and about 25 to 55 mole percent of ethylene glycol residues; and
   C. about 0.05 to 1.0 mole percent of the residue of a trifunctional monomer,
   wherein the second copolyester has an inherent viscosity of about 0.5 to 1.1 and a shear thinning ratio of at least about 2, and comprises:
   A. diacid residues comprising terephthalic acid residues; and
   B. diol residues comprising about 52 to 90 mole percent 1,4-cyclohexanedimethanol residues and about 10 to 48 mole percent ethylene glycol residues,
   and wherein the average amount of 1,4-cyclohexanedimethanol residues in the first and second copolyesters is between 52 to 75 mole percent.

7. The blend according to claim 6, wherein the first copolyester comprises:
   A. diacid residues comprising at least 40 mole percent of terephthalic acid residues;
   B. diol residues comprising about 45 to 65 mole percent of 1,4-cyclohexanedimethanol residues and about 35 to 55 mole percent of ethylene glycol residues; and
   C. about 0.05 to 1.0 mole percent of the residue of a benzenetricarboxylic acid or an hydride.

8. The blend according to claim 6, wherein the first copolyester has an inherent viscosity of about 0.6 to 0.9, and comprises:
   A. diacid residues comprising at least 40 mole percent of terephthalic acid residues;
   B. diol residues comprising about 45 to 75 mole percent of 1,4-cyclohexanedimethanol residues and about 25 to 55 mole percent of ethylene glycol residues; and
   C. about 0.1 to 0.25 mole percent of the residue of a benzenetricarboxylic acid or anhydride, and
   wherein the second copolyester has an inherent viscosity of about 0.6 to 0.9, and comprises:
   A. diacid residues comprising terephthalic acid residues; and
   B. diol residues comprising about 52 to 90 mole percent 1,4-cyclohexanedimethanol residues and about 10 to 48 mole percent ethylene glycol residues.

9. The blend according to claim 6, wherein the first copolyester has an inherent viscosity of about 0.6 to 0.9, and comprises:
   A. diacid residues consisting essentially of terephthalic acid residues;
   B. diol residues consisting essentially of about 48 to 65 mole percent 1,4-cyclohexanedimethanol residues and about 35 to 52 mole percent ethylene glycol residues; and
   C. about 0.1 to 0.25 mole percent trimellitic acid or anhydride residues.

10. A shaped article extrusion blow-molded from the blend of claim 1.

11. A container extrusion blow-molded from the blend of claim 9.

12. The blend according to claim 1, wherein the trifunctional monomer is selected from the group consisting of tricarboxylic acids or esters thereof and aliphatic triols.

13. The blend according to claim 12, wherein the trifunctional monomer is a benzenetricarboxylic acid or anhydride.

14. The blend according to claim 13, wherein the trifunctional monomer is trimellitic acid or anhydride.

15. The blend according to claim 1, where in the phosphorus catalyst quencher is selected from the group consisting of phosphoric acid, phosphorous acid, phosphate ester, and phosphite ester.

16. The blend according to claim 1, wherein the phosphorus catalyst quencher is present in an amount that provides an elemental phosphorus content of about 0.1 to 0.25 weight percent.

* * * * *